US007119457B1

(12) United States Patent  (10) Patent No.: US 7,119,457 B1
Flegel  (45) Date of Patent: Oct. 10, 2006

(54) PRIORITIZED ACTUATION SYSTEM WITH OVERLOAD PROTECTION FOR A GENERATOR TRANSFER SWITCH

(75) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 232 days.

(21) Appl. No.: 10/364,821

(22) Filed: Feb. 11, 2003

(51) Int. Cl.
*H02J 9/04* (2006.01)
(52) U.S. Cl. .......................................... 307/64; 307/86
(58) Field of Classification Search .................. 307/64, 307/86
See application file for complete search history.

(56) References Cited

U.S. PATENT DOCUMENTS 3,624,304 A * 11/1971 Formenti et al. ........... 370/308
6,172,432 B1 * 1/2001 Schnackenberg et al. ..... 307/23
6,181,028 B1 * 1/2001 Kern et al. ................... 307/64
2002/0079741 A1 * 6/2002 Anderson .................... 307/64

* cited by examiner

*Primary Examiner*—Brian Sircus
*Assistant Examiner*—Dru Parries
(74) *Attorney, Agent, or Firm*—Boyle, Fredrickson, Newholm, Stein & Gratz, S.C.

(57) ABSTRACT

A transfer switch, for use in connecting a series of electrical loads to an auxiliary power source, e.g. an electrical generator, includes a series of switches that are interconnected with the electrical loads, and a controller interconnected with certain of the switches. The controller actuates the switches in a predetermined order of priority, to supply power to selected electrical loads. In the event actuation of one of the switches results in an overload condition, the controller deactuates the switch and subsequently reactuates the switch after a predetermined delay. When all of the switches are actuated, the controller monitors the level of electrical load on the auxiliary power source, and de-actuates all of the switches in the event of an overload condition. The switches are then reactuated in the order of priority to restore power to the loads. Additional switches may be manually operated to supply auxiliary power to other loads.

21 Claims, 4 Drawing Sheets

PRIORITIZED ACTUATION SYSTEM WITH OVERLOAD PROTECTION FOR A GENERATOR TRANSFER SWITCH

BACKGROUND AND SUMMARY OF THE INVENTION

This invention relates to a transfer switch of the type that is adapted to be interconnected with an auxiliary power source such as an electrical generator, for controlling the supply of electrical power from the generator to branch electrical circuits in an electrical load center.

Transfer switches for use with an auxiliary power source, such as an electrical generator, are known in the prior art. A transfer switch typically performs the function of controlling the supply of power from the generator to one or more branch electrical circuits contained within a building, in the event of an outage or disruption of power from a primary power source such as a utility. Typically, the transfer switch is interconnected with selected branch circuits to supply power to electrical loads contained within the building, which normally are devices or appliances such as a furnace, sump pump, refrigerator or freezer.

The majority of prior art transfer switches are manually operated. With transfer switches of this type, the operator initiates operation of the generator and connects the generator to the transfer switch, unless there is a permanent connection between the generator and the transfer switch. The individual switches or circuit breakers of the transfer switch are then actuated to supply power from the generator to the circuits in which the individual transfer switches are connected. While this type of transfer switch arrangement functions satisfactorily, it requires the presence of a person, such as the homeowner, to undertake the operations necessary to start the generator and actuate the switches to supply power from the generator to the electrical circuits. For this reason, automatic transfer switches have been developed to automatically initiate operation of a generator upon a discontinuation or disruption in the supply of utility power, and to connect certain of the electrical circuits to the generator. Examples of such switches are illustrated in Schell et al U.S. Pat. No. 4,398,097; DeVisser et al U.S. Pat. No. 3,778,633; and Schnackenberg et al U.S. Pat. No. 6,172,432. The '432 patent illustrates a complicated switch mechanism incorporating numerous circuits and control logic for carrying out the functions of an automatic transfer switch.

It is an object of the present invention to provide a transfer switch arrangement for interconnecting branch circuits with an auxiliary power source, such as a generator, in the event of a disruption or discontinuation in the supply of power from a primary power source, such as a utility. It is a further object of the invention to provide such a transfer switch arrangement in which power is supplied to the branch circuits in accordance with a predetermined order of priority, while providing a protection feature that prevents an overload condition on the generator. It is a further object of the invention to provide such a transfer switch arrangement which enables certain of the branch circuits to be connected automatically and others of the branch circuits to be connected manually, or which enables all of the branch circuits to be connected manually to allow the user to override the automatic actuation sequence when desired. Yet another object of the invention is to provide such a transfer switch arrangement which is relatively simple in its components and construction, to provide a relatively low cost of manufacture, while nonetheless providing safe and reliable interconnection of branch circuits with the generator.

In accordance with the present invention, a transfer switch arrangement is adapted to be interposed between an auxiliary power source, such as a generator, and an electrical load center which is interconnected with a primary power source, such as utility power. The electrical load center includes a series of branch electrical circuits, each of which is connected with an electrical load. The transfer switch arrangement includes a series of switches, each of which is interconnected between the auxiliary power source and one of the branch circuits. The switches are normally in a first contact position in which the branch circuit is supplied with power from the primary power source. Upon actuation, each switch is movable to a second contact position in which the branch circuit is connected to the auxiliary power source. In one form, the switches are transfer-type switches and certain of the switches, are solenoid-driven for movement between the first and second contact position.

The transfer switch arrangement includes a controller interconnected with the series of switches. When electrical power from the primary power source is initially discontinued, the controller is operably configured to sequentially actuate the solenoid-driven switches for movement from the first contact position to the second contact position to sequentially connect the branch circuits to the auxiliary power source, preferably in accordance with a predetermined order of priority. During sequential actuation of the switches, the controller is operably configured to return any one of the solenoid-driven switches to the first contact position in the event actuation of the switch to the second contact position results in the total load on the auxiliary power source exceeding a predetermined threshold, to discontinue the supply of electrical power to the individual branch circuit from the auxiliary power source. The controller is further operably configured to monitor the load on the generator, and to re-actuate the switch when the load on the generator falls below the total load that existed prior to the previous attempt to actuate the switches. The controller continues to thereafter sequentially continue movement of the switches from the first contact position to the second contact position, in accordance with the predetermined order or priority, until all of the solenoid-driven switches are moved from the first contact position to the second contact position. The controller is further operably configured to continue to monitor the total load on the generator after all of the switches have been moved to the second contact position, and to return all of the switches to the first contact position from the second contact position in the event the total load on the generator exceeds the predetermined threshold. Thereafter, the controller is operably configured to again sequentially move the switches from the first contact position to the second contact position, again in accordance with the predetermined order of priority, to restore the supply of power from the auxiliary power source to the branch circuits.

The transfer switch arrangement includes a utility voltage sensor which is connected to the controller and to at least one of the branch circuits. The utility voltage sensor provides an input signal to the controller during operation of the utility power source. The controller reads and evaluates the input signal and determines whether the supply of utility power has been discontinued, according to predetermined parameters. If so, the controller actuates a generator starting circuit to initiate operation of the generator. A current sensor detects the load on the generator, and is interconnected with the controller which ascertains the current load on the generator and de-actuates the actuated switch, or all of the actuated switches, to the second contact position in the event the current load on the generator exceeds the predetermined threshold. A generator voltage sensor is connected to the controller and to the output of the generator, for providing an input signal to the controller during operation of the generator. The controller reads and evaluates the input signal and determines whether the supply of generator power is acceptable, according to predetermined parameters.

The controller functions to actuate certain of the switches according to the predetermined order of priority, to supply certain of the electrical loads with auxiliary power from the generator. The transfer switch arrangement may also include one or more additional switches interconnected with additional electrical loads, which can be manually actuated by the user to supply power to additional loads in the event the user is present during the utility power outage.

The invention contemplates a transfer switch arrangement as described above, as well as a method of supplying electrical power to a series of electrical loads upon a disruption in a primary source of electrical power, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
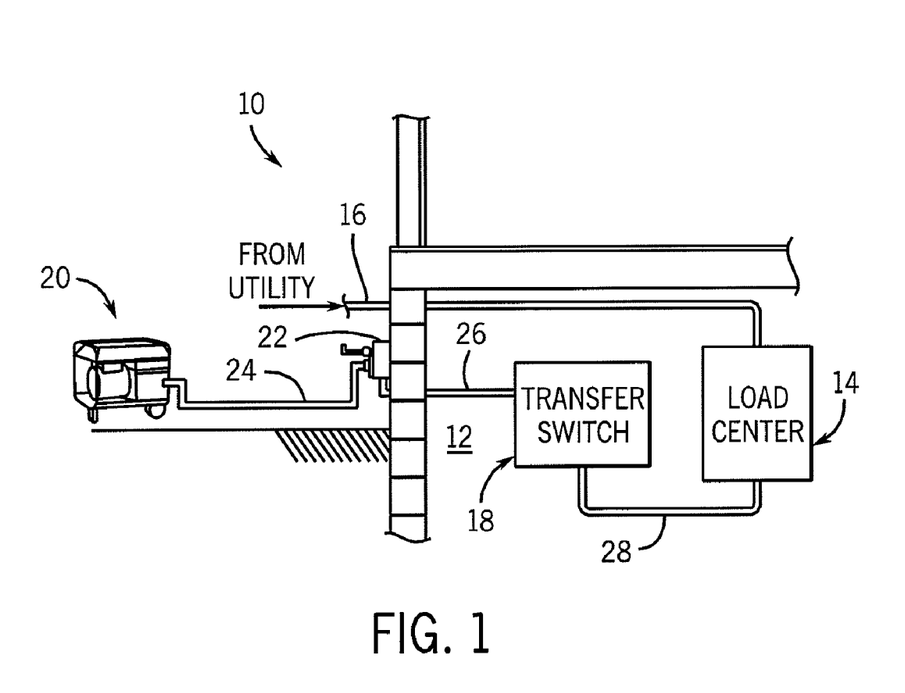
FIG. 1 is a schematic view illustrating the transfer switch arrangement of the present invention for interconnection between an auxiliary power source such as a generator and an electrical load center of a building.

Referring to FIG. 1, a building 10 includes an interior 12 within which a main electrical panel or load center 14 is located. In a known manner, electrical power from a primary power source, such as an electrical utility, is supplied to load center 14 via wiring contained within a conduit 16.

In order to supply power in the event of a disruption or discontinuation in the supply of power from the primary power source, load center 14 is interconnected with a transfer switch 18 in accordance with the invention, which is operable to control the supply of power to certain of the circuits contained within load center 14 from an auxiliary power source, such as a generator 20. In a representative installation, power from generator 20 is supplied to an exterior power inlet box 22 via a flexible cord 24. A conduit 26 extends between power inlet box 22 and transfer switch 18, and contains wiring for supplying auxiliary power to transfer switch 18. Generator 20 may be any satisfactory stand-alone or portable electrical power generator, as is known in the art. Power may be supplied from generator 20 to transfer switch 18 in a variety of ways as are known in the art, and the embodiment illustrated in FIG. 1 is presented simply for purposes of illustration.

Also in a known manner, certain of the branch circuits contained with load center 14 are interconnected with the individual switches of transfer switch 18 by means of wiring contained within a conduit 28.

Figure 2:
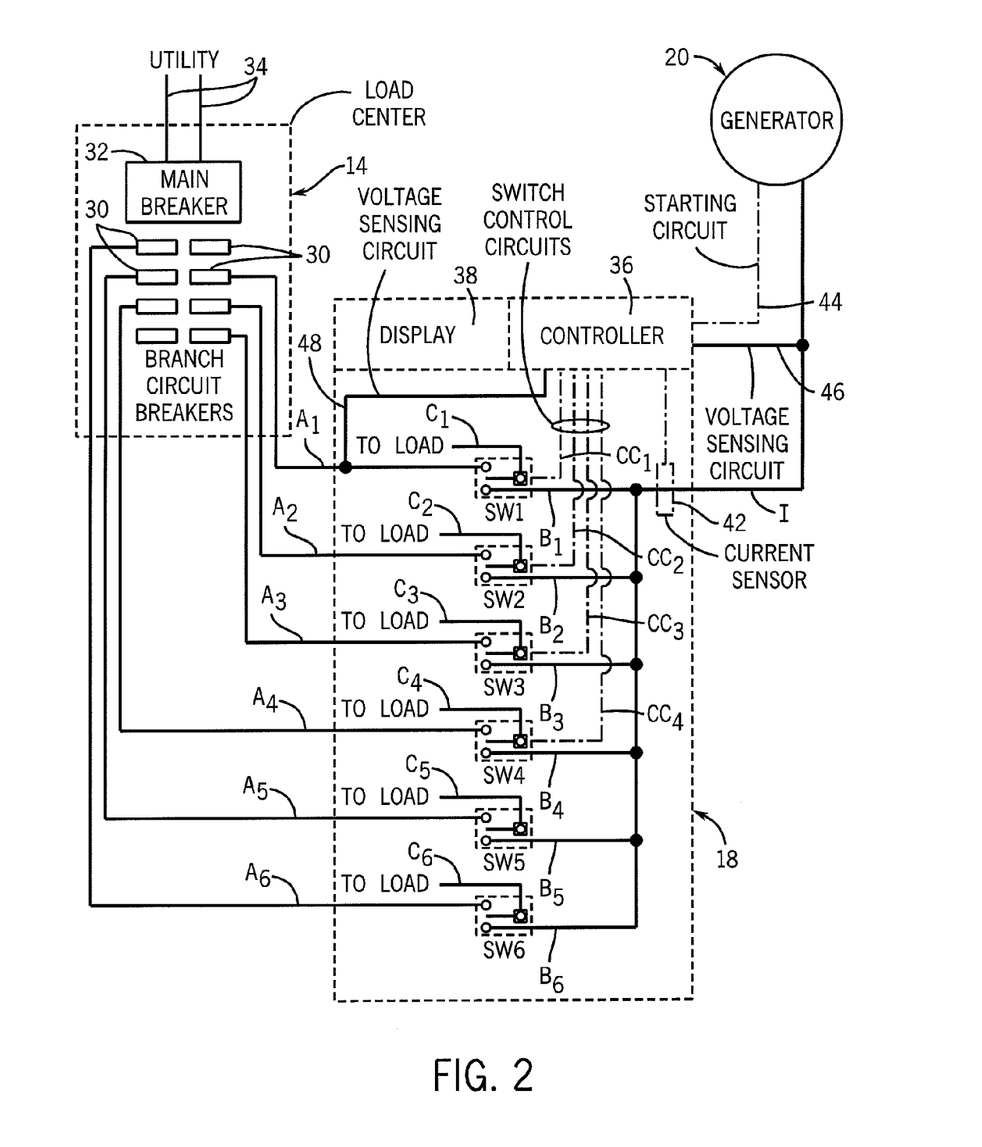
FIG. 2 is a schematic view showing the generator, load center and transfer switch arrangement of FIG. 1.

Referring to FIG. 2, the branch circuits contained within load center 14 are interconnected with one of a series of branch circuit breakers 30 incorporated in load center 14. Typically, a main circuit breaker 32 is interconnected with the utility power source, shown at 34.

Transfer switch 18 includes a series of switches SW1, SW2, SW3, SW4, SW5 and SW6. Switches SW1–SW6 are each in the form of individual transfer switch mechanisms of the type known as "break, then make", the construction of which ensures that the load interconnected with each of switches SW1–SW6 is exposed either to power from the branch circuit breaker 30 (utility power source) or from generator 20 and not from both sources, in accordance with known construction and operation of such transfer switch mechanisms.

In addition, transfer switch 18 includes a controller 36 and a visual display 38, which provides a visual output of various parameters of operation of transfer switch 18, e.g. voltage, current, wattage, etc.

Each of switches SW1–SW6 is connected to one of branch circuit breakers 30 through one of respective wires A1–A6. Each of switches SW1–SW6 is also connected to generator 20 through one of respective wires B1–B6, which are connected to an input wire I extending from generator 20. The common pole of each of switches SW1–SW6 is connected to the associated electrical load of the respective branch circuit breaker 30 through one of respective wires C1–C6.

Switches SW1–SW4 are single-pole double-throw switches that conform to UL Standard 1008, such as a switch manufactured by Reliance Controls Corporation of Racine, Wis. under its Model No. 7801, modified so as to allow the switch to be actuated by operation of an extendible and retractable mechanism such as a conventional solenoid. This configuration allows for both automatic and manual operation of the switch. Alternatively, it is understood that switches SW1–SW4 may be any other type of mechanically actuated switch mechanism capable of functioning as a transfer-type switch mechanism, e.g. a relay, contactor or interlocked circuit breaker.

Switches SW5 and SW6 are manually operated transfer switch mechanisms, such as the Reliance Controls transfer switch Model 7801. While transfer switch 18 is illustrated as having four automatic and two manual switch mechanisms, it is understood that any other combination of manual and automatic switch mechanisms may be employed. Further, it is understood that all of switches SW1–SW6 may be manually operated or all of switches SW1–SW6 may be automatically operated, or that the automatically operated switches may also be manually operated. The automatic switches, in this case switches SW1–SW4, are interconnected with controller 36 via switch control circuits, shown at CC1–CC4, respectively. Switch control circuits CC1–CC4 are operable in response to controller 36 for moving switches SW1–SW4, respectively, between a first contact position in which the switches establish communication between utility input lines A1–A4 and the loads interconnected with switches SW1–SW4, and a second contact position in which the switches establish communication between generator input lines B1–B4 and the loads interconnected with switches SW1–SW4. For the remainder of the description, the switches will be referred to as being actuated when in the second contact position to supply power from generator 20, and de-actuated when in the first contact position to supply utility power.

Transfer switch 18 further includes a current sensor 42 interconnected with controller 36 for providing inputs to controller 36 indicative of the current load on generator 20. Representatively, current sensor 42 may be a transformer-type current sensor, although it is understood that any other type of current sensor may be employed. In addition, controller 36 is interconnected with generator 20 via a generator starting circuit 44. A generator voltage sensing circuit 46 is interconnected with controller 36 for providing an input to controller 36 indicative of voltage in power input line I from generator 20. Similarly, a utility voltage sensing circuit 48 is interconnected between controller 36 and line A1, which in turn is interconnected with utility power source 34, for providing an input to controller 36 indicative of voltage in line A1 from the utility.

In operation, transfer switch 18 functions as follows to provide power from generator 20 to the loads interconnected with wires C1–C4.

Upon a discontinuation or interruption in the primary power source, e.g. utility power source 34, voltage sensing circuit 48 is operable to sense a voltage drop in line A1 that exceeds a predetermined threshold programmed into controller 36, which indicates that the primary source of power to load center 14 has been cut off. Controller 36 is responsive to the input from voltage sensing circuit 48, and operates starting circuit 44 to initiate operation of generator 20. Upon start-up of generator 20 in this manner, voltage sensing circuit 46 provides an input to controller 36 which indicates that power is supplied in line I, and thereby to switches SW1–SW4.

Controller 36 is operably configured to sequentially actuate switches SW1–SW4 according to a predetermined order of priority. For example, switch SW1 may be interconnected with a load deemed to be most important within the interior of building 10, e.g. a furnace or air conditioning system. Switch SW2 may be interconnected with the electrical load deemed the next most important, e.g. a sump pump, and switches SW3 and SW4 may be interconnected with the loads deemed next most important, e.g. a refrigerator and a freezer. It is understood that the switches may be interconnected with any load to which it is desired to supply power in the event of a power outage, and that the enumerated loads are simply illustrative. Switches SW5 and SW6 may be interconnected with loads deemed less important or non-essential, e.g. a well pump, microwave oven, room lights, etc.

Figure 3:
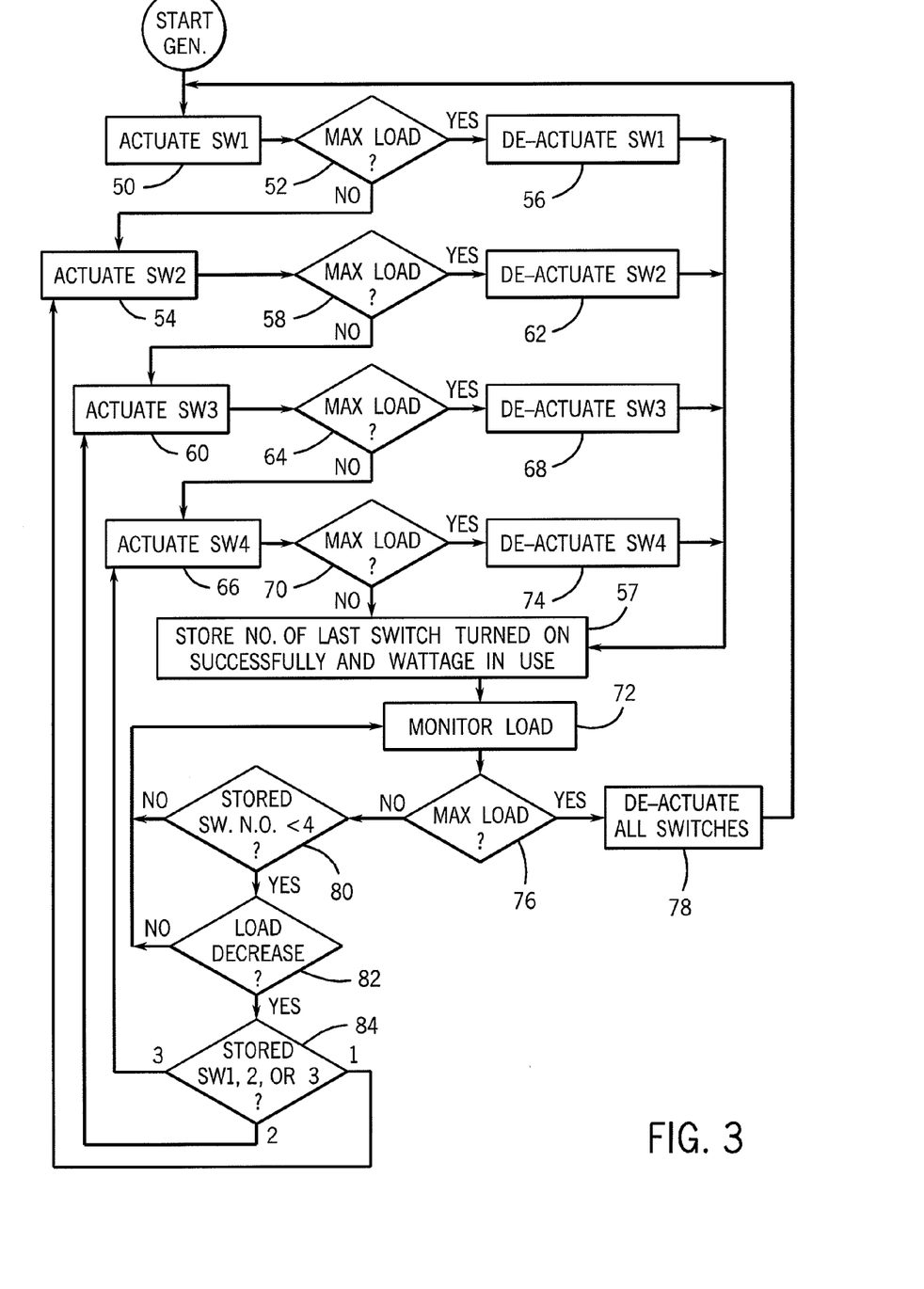
FIG. 3 is a flow chart illustrating operation of the transfer switch arrangement of FIGS. 1 and 2.

Controller 36 operates as shown in FIG. 3 to operate switches SW1–SW4 when the supply of power from generator 20 is detected. Upon start-up of generator 20, controller 36 actuates switch SW1 at step 50, to supply power from generator 20 to the first load in the order of priority through line C1. Controller 36 then proceeds to step 52 to ascertain whether the current load on generator 20, as detected by current sensor 42, is above the predetermined threshold corresponding to an overload condition for generator 20. If not, controller 36 proceeds to step 54 after a predetermined time delay, to actuate switch SW2 and to supply power from generator 20 to the next load in the order of priority through line C2. If the load on generator 20 exceeds the maximum load, controller 36 proceeds to step 56 to de-actuate switch SW1, and subsequently to step 57 to store the number of the last switch that was turned on successfully (in this case no information is stored, since there are no switches prior to switch SW1 to be turned on). Operation of controller 36 subsequent to step 57 will later be explained.

After controller 36 has actuated switch SW2 at step 54 to supply power to the load interconnected with switch SW2, controller 36 proceeds to step 58 to ascertain whether the current load on generator 20 is above the predetermined threshold corresponding to an overload condition for generator 20. If not, controller 36 proceeds to step 60 after a predetermined time delay, to actuate switch SW3 and to supply power from generator 20 to the next load in the order of priority through line C3. If the load on generator 20 exceeds the maximum load, controller 36 proceeds to step 62 to de-actuate switch SW2, and subsequently to step 57 to store the number of the last switch turned on successfully (in this case switch SW1) and the wattage in use at the time switch SW1 was successfully actuated.

After actuation of switches SW1, SW2 and SW3 to supply power to the first three loads in the order of priority, controller 36 proceeds to step 64 to ascertain whether the current load on generator 20 is above the predetermined threshold corresponding to an overload condition for generator 20. If not, controller 36 proceeds to step 66 after a predetermined time delay, to actuate switch SW4 and to supply power from generator 20 to the next load in the order of priority through line A4. If the load on generator 20 exceeds the maximum load, controller 36 proceeds to step 68 to de-actuate switch SW3, and to step 57 to store the number of the last switch turned on successfully (in this case switch SW2) and the wattage in use at the time switch SW2 was successfully actuated.

After switches SW1, SW2, SW3 and SW4 have been actuated, controller 36 proceeds to step 70 to ascertain whether the current load on generator 20 is above the predetermined threshold corresponding to an overload condition for generator 20. If not, controller 36 proceeds to step 72 to continuously monitor the load on generator 20. If the load on generator 20 exceeds the maximum load, controller 36 proceeds to step 74 to de-actuate switch SW4, and subsequently to step 57 to store the number of the last switch turned on successfully (in this case switch SW3) and the wattage in use at the time switch SW 3 was successfully actuated.

Subsequent to actuation of all of switches SW1–SW4, or after de-actuation of any one of switches SW1–SW4 during the actuation sequence and storage of the switch number at step 57, controller 36 proceeds to step 72 to monitor the load on generator 20. While monitoring the load on generator 20 at step 72, controller 36 proceeds to step 76 to ascertain whether the current load on generator 20 is above the predetermined threshold corresponding to an overload condition for generator 20. If so, controller 36 proceeds to step 78 to de-actuate all of switches SW1–SW4 and to initiate switch actuation in the same manner and sequence as set forth above. If the maximum load condition is no longer present at step 76 (e.g. in the event one or more of the loads have ceased to be in a start-up or run mode), controller 76 proceeds to step 80 to ascertain whether the number of the switch stored at step 57 is less than switch SW4. If the number of the switch stored at step 57 is less than switch SW4, controller 36 proceeds to step 82 to ascertain whether the current load on generator 20 has decreased to a level below the total load that existed when the last switch was successfully actuated. If not, controller 36 cycles back to step 72 to monitor the load on generator 20. If the maximum load condition persists, controller 36 proceeds to step 78 to de-actuate all of switches SW1–SW4 and to subsequently initiate actuation of switches SW1–SW4 as set forth above. If the load on generator 20 has decreased to a level below the total running wattage that existed when the last switch was successfully actuated, controller 36 proceeds to step 84 to ascertain the number of the switch stored at step 57. If the stored switch number is switch SW1, controller 36 returns to step 54 to actuate switch SW2. If the stored switch number is switch SW2, controller 36 returns to step 60 to actuate switch SW3. If the stored switch number is switch SW3, controller 36 returns to step 66 to actuate switch SW4. After actuation of the respective one of switches SW2–SW4 subsequent to step 84, controller 36 continues to cycle through the switch actuation and load sensing steps as set forth above. In almost all cases, all of switches SW1–SW4 will eventually be actuated so as to supply power to the loads interconnected therewith by operation of generator 20. After all of switches SW1–SW4 are actuated, the user can manually actuate one or both of switches SW5 and SW6, to supply power from generator 20 to additional electrical loads if desired. In addition, it is understood that the user may also manually deactuate and subsequently actuate switches SW1–SW4, in order to manually manage the load on generator 20 and thereby overriding the automatic actuation sequence feature provided by the invention.

When power supplied by utility power source 34 is resumed, voltage sensing circuit 48 senses voltage in line A1 and controller 36 is operated to stop operation of generator 20 through starting circuit 44. Switch control circuits CC1–CC4 are then operated to de-actuate switches SW1–SW4 to the first contact position to resume the supply of power to the respective loads from utility power source 34.

Figure 4:
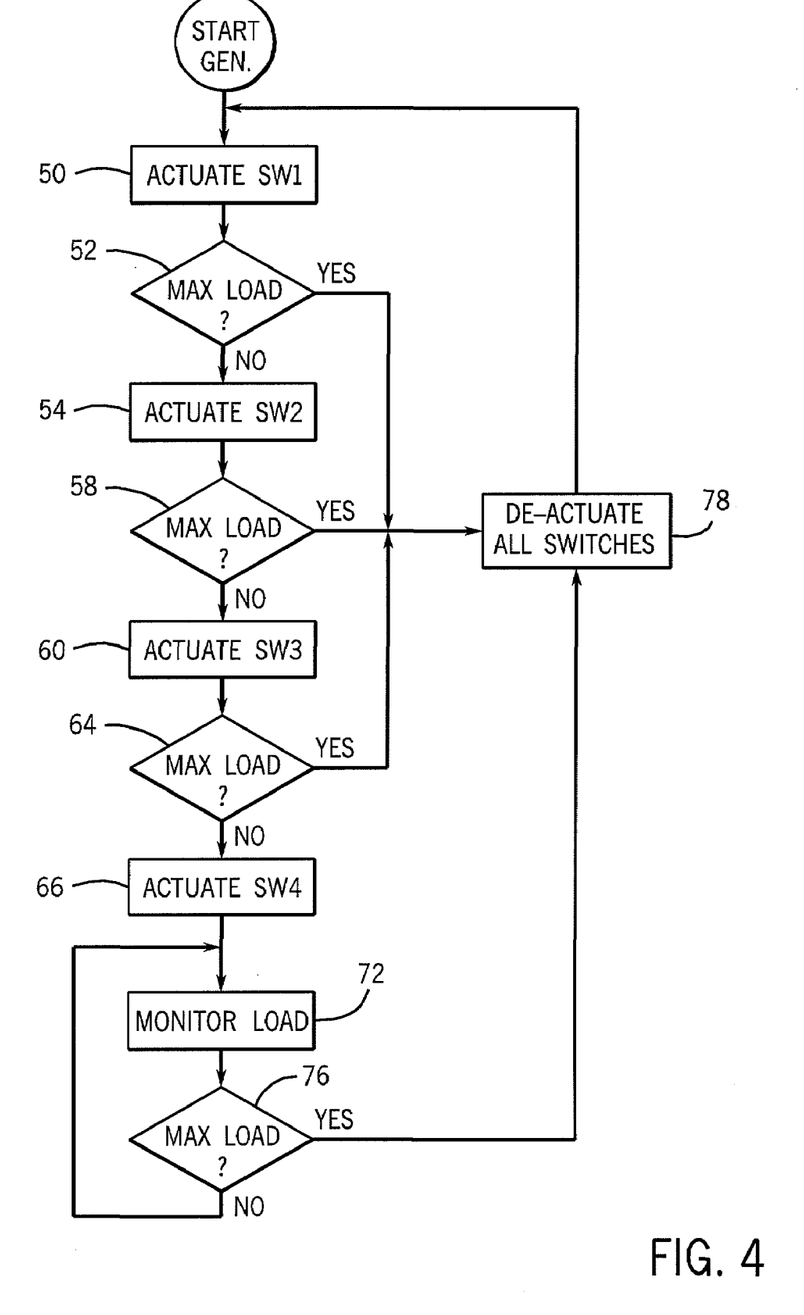
FIG. 4 is a flow chart illustrating an alternative embodiment for operating the transfer switch arrangement of FIGS. 1 and 2.

FIG. 4 illustrates an alternative sequence of operation carried out by controller 36. In the operation sequence shown in FIG. 4, controller 36 proceeds to step 78 to de-actuate all switches in the event actuating any one of switches SW1, SW2 or SW3 results in an overload condition during the initial switch actuation sequence. Controller 36 then re-initiates switch actuation with switch SW1 after all switches have been de-actuated at step 78, to initiate switch actuation without ascertaining whether the load on generator 20 has decreased. Subsequent to actuation of switch SW4, controller 36 continuously monitors the load on generator 20 and de-actuates all of switches SW1–SW4 in the event of an overload condition, and subsequently reinitiates actuation of the switches.

While the invention has been shown and described with respect to a specific embodiment, it is understood that numerous variations and modifications are possible and contemplated as being within the scope of the invention. For example, and without limitation, while the controller is described as sequentially actuating the switches in the same order of priority at initial start-up and subsequent to deactuation of all the switches in response to an overload condition, it is also contemplated that the controller maybe operably configured to actuate the switches in accordance with different orders of priority. Further, while the transfer switch of the present invention has been shown and described as being contained within an enclosure separate from the load center, it is also contemplated that the load center and the transfer switch of the present invention may be combined into a single enclosure. While the invention has been shown and described with respect to actuation of transfer switches which are interconnected in the electrical load circuits to alternately supply power from either one power source or another, it is also contemplated that the priority-type switch actuation arrangement of the present invention may be used to actuate switches other than transfer-type switches to sequentially supply power to a series of electrical loads from a power source. The invention may be used in an application other than one in which power is supplied to loads from an auxiliary power source in the event of a discontinuation in the supplier of power from a primary power source, e.g. sequential connection of electrical loads to any type of power source upon initial start-up. While the switches are described as being actuated subsequent to a programmed time delay, it is understood that other types of sequential operation may be employed that are not dependent upon a predetermined time period, e.g. a circuit arrangement that verifies connection of the prior load and then is operated to connect the next load.

It can thus be appreciated that the present invention provides a switching arrangement, such as a transfer-type switch, which sequentially connects a series of electrical loads to a power source according to an order of priority, and which incorporates a simple yet effective system for ensuring that the load on the auxiliary power source does not exceed a predetermined threshold.

Various alternatives and embodiments are contemplated as being within the scope of the following claims particularly pointing out and distinctly claiming the subject matter regarded as the invention.

I claim:

1. A method of supplying electrical power to a plurality of electrical loads, wherein each electrical load is interconnected with a primary source of electrical power, comprising the steps of:

supplying electrical power from an auxiliary power source upon a discontinuation in the supply of power from the primary power source;

continuously monitoring the total load on the auxiliary power source;

sequentially supplying power to the plurality of electrical loads from the auxiliary power source in a first power supply sequence, in accordance with an order of priority;

during the first power supply sequence, discontinuing the supply of power to lower priority one of the electrical loads in the plurality of electrical loads from the auxiliary power source in the event the total load on the auxiliary power source exceeds a predetermined threshold when power is supplied to the lower priority one of the electrical loads;

continuing to subsequently sequentially supply power to the plurality of electrical loads from the auxiliary power source in the first power supply sequence in accordance with the order of priority when the total load on the auxiliary power source falls below the predetermined threshold, to restore the supply of power to the lower priority one of the electrical loads;

wherein the first power supply sequence terminates when all of the loads in the plurality loads are supplied with power from the auxiliary power source;

discontinuing the supply of power to all of the electrical loads in the plurality of electrical loads when, after termination of the first power supply sequence, the total load on the auxiliary power source exceeds the predetermined threshold; and subsequently supplying power to the plurality of electrical loads in a second power supply sequence, in accordance with the predetermined order of priority.

2. The method of claim 1, further comprising the step of discontinuing the supply of power to all of the electrical loads prior to termination of the first power supply sequence when the total load on the auxiliary power supply exceeds the predetermined threshold when, during the first power supply sequence, the total load on the auxiliary power supply remains above the predetermined threshold after the supply of power to the lower priority electrical load is discontinued.

3. The method of claim 1, wherein the steps of sequentially supplying power to the electrical loads in the first power supply sequence, discontinuing the supply of power, and subsequently sequentially supplying power to the electrical loads in the second power supply sequence are carried out by operation of a series of switches, wherein each switch is interposed between the auxiliary power source and one of the electrical loads.

4. The method of claim 3, wherein the steps of sequentially supplying power to the electrical loads in the first power supply sequence, discontinuing the supply of power, and subsequently sequentially supplying power to the electrical loads in the second sequence are carried out by selectively moving each of the switches between an actuated position and a de-actuated position.

5. The method of claim 4, wherein the step of discontinuing the supply of power to all of the electrical loads is carried out by simultaneously moving all of the switches that are in the actuated position to the de-actuated position when the total load on the auxiliary power source exceeds the predetermined threshold.

6. The method of claim 5, wherein the steps of sequentially supplying power in the first power supply sequence and subsequently sequentially supplying power in the second power supply sequence are carried out by sequentially operating individual ones of the switches for movement from the de-actuated position to the actuated position.

7. The method of claim 6, wherein each switch is moved from the de-actuated position to the actuated position subsequent to a predetermined time delay after movement of the prior switch from its de-actuated position to its actuated position.

8. The method of claim 7, wherein the step of simultaneously moving all of the switches that are in the actuated position to the de-actuated position, and the steps of sequentially operating individual ones of the switches for movement from the de-actuated position to the actuated position in the second power supply sequence, are carried out by a controller configured to monitor the total load on the auxiliary power source, and an automatic actuating arrangement associated with at least some of the switches and responsive to the controller for moving at least some of the switches from the de-actuated position to the actuated position.

9. The method of claim 6, wherein the step of sequentially operating individual ones of the switches for movement from the de-actuated position to the actuated position is carried out by manually moving the switches from the de-actuated position to the actuated position according to the order of priority.

10. The method of claim 3, wherein the series of switches are incorporated in a transfer switch arrangement, and including the step of positioning the transfer switch arrangement between the auxiliary power source and an electrical load center, wherein the load center is electrically interconnected with the series of electrical loads and with the primary source of electrical power.

11. A method of supplying electrical power to a series of electrical loads, wherein each electrical load is interconnected with a primary source of electrical power, comprising the steps of:

supplying electrical power from an auxiliary power source upon a discontinuation in the supply of power from the primary power source;
sequentially supplying power to the series of electrical loads from the auxiliary power source;
discontinuing the supply of power to at least one of the electrical loads from the auxiliary power source in the event the total load on the auxiliary power source exceeds a predetermined threshold; and
subsequently sequentially supplying power to the series of electrical loads from the auxiliary power source to restore the supply of power to the series of electrical loads wherein the step of sequentially supplying power to the series of electrical loads, is carried out according to an order of priority for the series of electrical loads, wherein the steps of sequentially supplying power, discontinuing the supply of power and subsequently sequentially supplying power are carried out by operation of a series of switches, wherein each switch is interposed between the auxiliary power source and one of the electrical loads wherein the step of discontinuing the supply of power to all of the electrical loads is carried out by simultaneously moving all of the switches that are in an actuated position to a de-actuated position when the total load on the auxiliary power source exceeds the predetermined threshold, wherein the steps of sequentially supplying power and subsequently sequentially supplying power are carried out by sequentially operating individual ones of the switches for movement from the de-actuated position to the actuated position, wherein each switch is moved from the de-actuated position to the actuated position subsequent to a predetermined time delay after movement of the prior switch from its de-actuated position to its actuated position, wherein the step of simultaneously moving all of the switches that are in an actuated position to an de-actuated position, and the steps of sequentially operating individual ones of the switches for movement from the de-actuated position to the actuated position, are carried out by a controller configured to monitor the total load on the auxiliary power source, and an automatic actuating arrangement associated with at least some of the switches and responsive to the controller for moving at least some of the switches from the de-actuated position to the actuated position, wherein the automatic actuator arrangement is operable to move certain of the switches from the de-actuated position to the actuated position, and further comprising the step of manually moving certain of the switches from the de-actuated position to the actuated position subsequent to movement of others of the switches from the de-actuated position to the actuated position via the automatic actuating arrangement.

12. A transfer switch arrangement adapted to be interposed between an auxiliary power source and an electrical load center, wherein the electrical load center is interconnected with a primary power source and includes a series of branch electrical circuits, each of which is interconnected with an electrical load, comprising:
a controller;
a series of switches, wherein each switch is interconnected between the auxiliary power source and one of the branch circuits, wherein each of the switches is movable in response to the controller between an actuated position and a de-actuated position, and wherein the controller is operable to sequentially move the switches in a first power supply sequence in an order of priority from the de-actuated position to the actuated position upon a discontinuation in the supply of power from the primary power source to supply power to the branch circuits from the auxiliary power source;

wherein, during the first power supply sequence, the controller is operable to move a lower priority one of the switches to the de-actuated position when the total load on the auxiliary power source exceeds a predetermined threshold so as to discontinue the supply of electrical power to at least one of the branch circuits from the auxiliary power source;

wherein the controller is further operable to move the de-actuated lower priority switch to the actuated position to restore the supply of power from the auxiliary power source to the branch circuit interconnected with the lower priority switch when the total load on the auxiliary power source falls below the predetermined threshold; and wherein the controller is further operable to terminate the first power supply sequence when all of the switches are in the actuated position; move all of the switches to the de-actuated position when, after termination of the first power supply sequence, the total load on the auxiliary power source exceeds the predetermined threshold; and subsequently move the switches to the actuated position in a second power supply sequence, in accordance with the order of priority.

13. The transfer switch arrangement of claim 12, wherein the controller is operable to provide movement of the switches from the de-actuated position to the actuated position in the order of priority after simultaneously moving all of the actuated switches to the de-actuated position when the total load on the auxiliary power source exceeds the predetermined threshold either during the first power supply sequence or during the second power supply sequence.

14. The transfer switch arrangement of claim 12, wherein the controller is operable to simultaneously move all of the switches to the de-actuated position when the total load on the auxiliary power source exceeds the predetermined threshold either during the first power supply sequence when the total load on the auxiliary power source exceeds the predetermined threshold after moving the lower priority one of the switches to the de-actuated position, or after termination of the first power supply sequence when the total load on the auxiliary power source exceeds the predetermined threshold.

15. The transfer switch arrangement of claim 14, wherein the controller is operable to provide movement of the switches from the de-actuated position to the actuated position according to the same order of priority in both the first and second power supply sequences.

16. The transfer switch arrangement of claim 12, wherein the switches and the controller are contained in a transfer switch housing separate from a housing associated with the electrical load center, wherein the switches are interconnected with the branch circuits via wires that extend between the transfer switch housing and the load center housing.

17. A transfer switch arrangement adapted to be interposed between an auxiliary power source and an electrical load center, wherein the electrical load center is interconnected with a primary power source and includes a series of branch electrical circuits, each of which is interconnected with an electrical load, comprising:

a series of switches, wherein each switch is interconnected between the auxiliary power source and one of the branch circuits, wherein each of the switches is movable between an actuated position and a de-actuated position, and wherein the switches are adapted to be sequentially moved from the de-actuated position to the actuated position upon a discontinuation in the supply of power from the primary power source to supply power to the branch circuits from the auxiliary power source;

a controller interconnected with the series of switches, wherein the controller is operable to simultaneously move at least one of the switches to the de-actuated position when the total load on the auxiliary power source exceeds a predetermined threshold so as to discontinue the supply of electrical power to at least one of the branch circuits from the auxiliary power source; and wherein the de-actuated switch is adapted to be subsequently sequentially moved from the de-actuated position to the actuated position to restore the supply of power from the auxiliary power source to the branch circuit interconnected therewith;

wherein the controller is operably configured to simultaneously move all of the switches to the de-actuated position when the total load on the auxiliary power source exceeds the predetermined threshold, and to provide initial movement of selected ones of the switches from the de-actuated position to the actuated position upon discontinuation in the supply of power from the primary power source in accordance with a predetermined order of priority, and to provide subsequent sequential movement of selected ones of the switches from the de-actuated position to the actuated position subsequent to the controller simultaneously moving all of the switches to the de-actuated position when the total load on the auxiliary power source exceeds the predetermined threshold, wherein others of the switches are manually movable from the de-actuated position to the actuated position subsequent to movement of the selected ones of the switches from the de-actuated position to the actuated position in accordance with the predetermined order of priority.

18. A transfer switch arrangement adapted to be interposed between an auxiliary power source and an electrical load center, wherein the electrical load center is interconnected with a primary power source and includes a series of branch electrical circuits, each of which is interconnected with an electrical load, comprising:

a controller;

load sensing means interconnected with the controller; and a series of switches, wherein each switch is interconnected with the controller and interposed between the auxiliary power source and one of the branch electrical circuits, wherein the switches are actuated by the controller upon a discontinuation in the supply of power from the primary power source so as to interconnect the branch electrical circuits with the auxiliary power source;

wherein the controller is operably configured to operate the switches to:

sequentially actuate the switches in a first power supply sequence in an order of priority upon a discontinuation in the supply of power from the primary power source to supply power to the branch circuits from the auxiliary power source, wherein, during the first power supply sequence, the controller is operable to de-actuate a lower priority one of the switches when the total load on the auxiliary power source exceeds a predetermined threshold so as to discontinue the supply of electrical power to at least one of the branch circuits from the auxiliary power source;

move the de-actuated lower priority switch from the de-actuated position to the actuated position to restore the supply of power from the auxiliary power source to the branch circuit interconnected therewith when the total load on the auxiliary power source falls below the predetermined threshold;

terminate the first power supply sequence when all of the switches are in the actuated position;

move all of the switches to the de-actuated position when, after termination of the first power supply sequence, the total load on the auxiliary power source exceeds the predetermined threshold; and subsequently move the switches to the actuated position in a second power supply sequence, in accordance with the order of priority.

19. The transfer switch arrangement of claim 18, further comprising one or more additional switches that are manually controlled independent of the controller for controlling the supply of power from the auxiliary power source to one or more branch electrical circuits interconnected with the one or more additional switches.

20. The transfer switch arrangement of claim 18, wherein the controller and the switches are contained within a transfer switch housing separate from a housing associated with the electrical load center, wherein the series of switches are interconnected with the branch circuits via wires that extend between the transfer switch housing and the load center housing.

21. The transfer switch arrangement of claim 20, wherein the load sensing means comprises a current sensor interconnected with the controller and contained within the transfer switch housing for sensing the current load on the auxiliary power source.

* * * * *